July 18, 1939.  W. A. REICHEL ET AL  2,166,610
REMOTE MULTIPLE INDICATOR
Filed Nov. 15, 1935   3 Sheets-Sheet 1
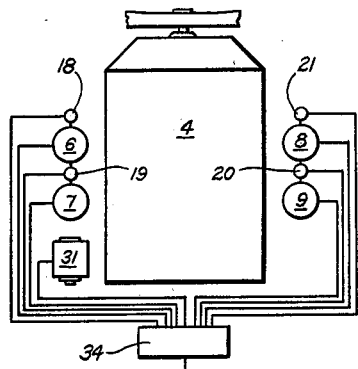
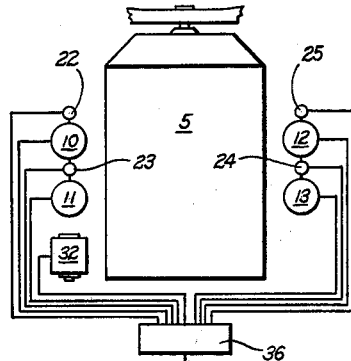
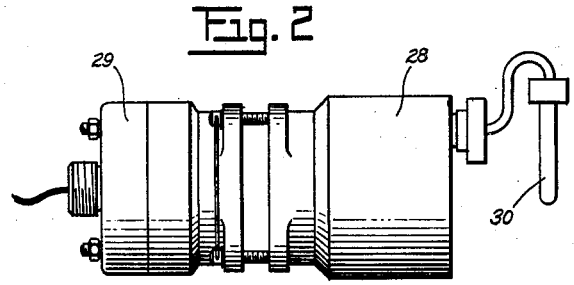
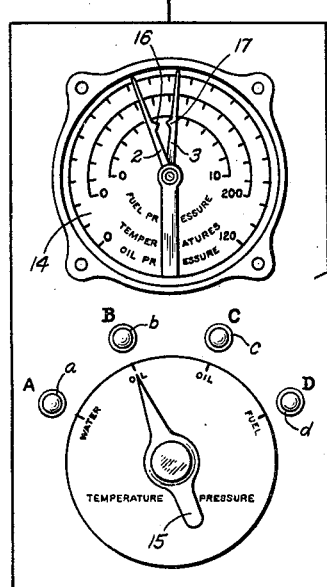
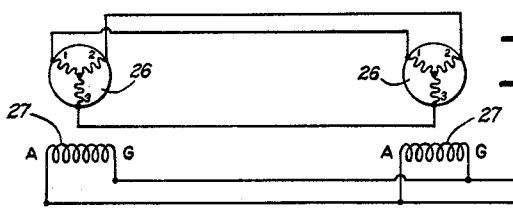
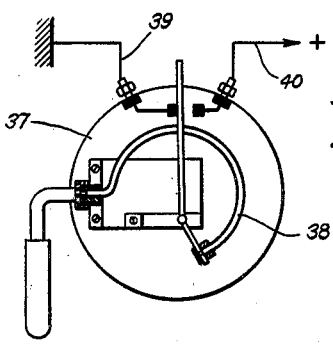
INVENTORS.
Wladimir A. Reichel
Morris F. Ketay
BY
Stephen Cerstvik
ATTORNEY.

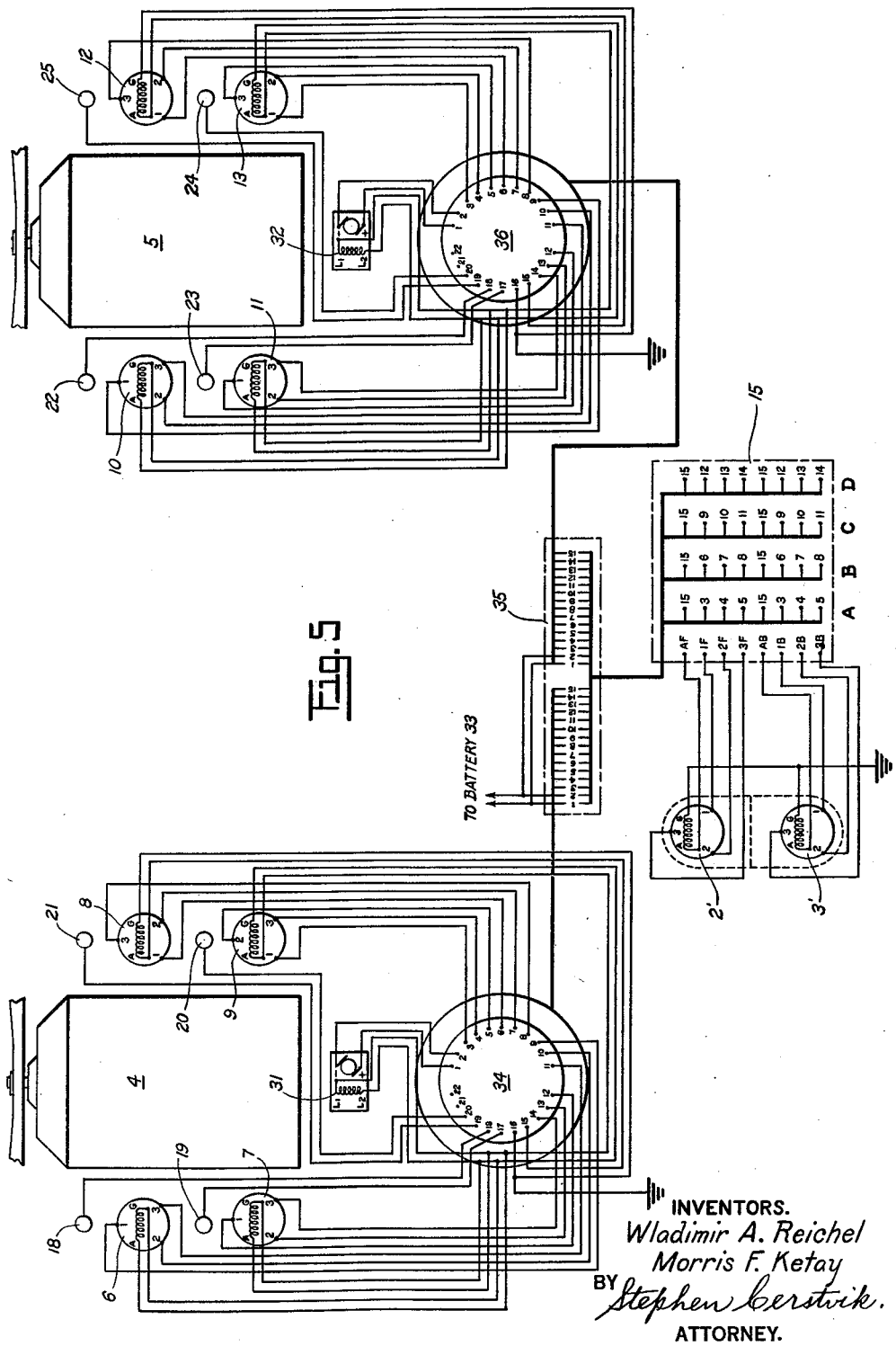

INVENTORS.
Wladimir A. Reichel
Morris F. Ketay
BY Stephen Cerstvik
ATTORNEY.

Patented July 18, 1939

2,166,610

UNITED STATES PATENT OFFICE 2,166,610

REMOTE MULTIPLE INDICATOR

Wladimir A. Reichel, Philadelphia, Pa., and Morris F. Ketay, Brooklyn, N. Y., assignors to Bendix Aviation Corporation, South Bend, Ind., a corporation of Delaware Application November 15, 1935, Serial No. 50,024
In France July 22, 1935

2 Claims. (Cl. 177—311)

The present invention relates to indicators, and more particularly to electrically and remotely operated indicators.

The invention consists essentially in the provision of a novel remotely operated indicator whereby indications of several remotely located measuring devices may be obtained on one dial. To this end, an indicator is provided having a single dial provided with a plurality of scales over which one or more pointers are adapted to move, electrical means for actuating said pointer or pointers, and means whereby said pointer actuating means may be alternately connected to electrical devices operated by various remotely located measuring devices.

In accordance with the invention, several indicators operated by various measuring devices normally employed on an aircraft, for example, for the purpose of indicating to the pilot the different factors characterizing the operation of the engines of the aircraft, are replaced by a single indicator which may be connected, at will, by the pilot, with remotely located measuring devices of these different factors so as to indicate on a single dial the operating characteristics of one or more engines. The indicator also includes pilot lamps which are so arranged as to be automatically lighted as soon as a given condition or operating function of the engine or engines exceeds a predetermined limit. Thus, the pilot is no longer required to constantly observe the engine instruments showing the operating characteristics of the engine or engines and can concentrate his attention upon the flight instruments, knowing that the engines are running satisfactorily as long as the pilot lamps of the indicator are not lighted.

The invention will be better understood from the following description and the accompanying drawings which show one form of apparatus for carrying out the invention.

In the drawings wherein like reference characters refer to like parts throughout the several views:

Fig. 1 is a diagrammatic plan view of one form of apparatus embodying the invention as applied to a twin-engined aircraft;

Fig. 2 is an exterior view of an "Autosyn" or "Selsyn" transmitting motor combined with a temperature- (or pressure-) responsive actuator;

Fig. 3 is a circuit diagram of an "Autosyn" or "Selsyn" transmitting motor and a similar receiving motor;

Fig. 4 is a detail view of one of the control mechanisms or interruptors for interrupting the circuit of a pilot or warning lamp;

Fig. 5 is a wiring diagram of the system and apparatus shown in Fig. 1;

Figure 6:
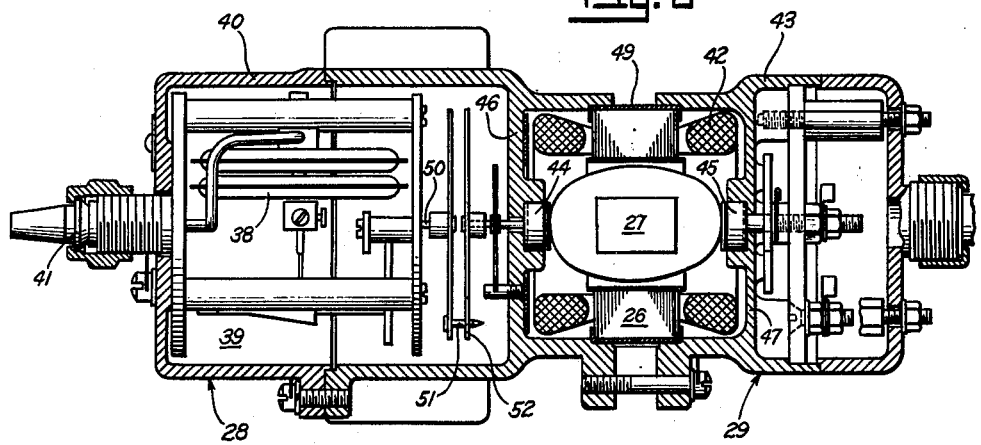
Fig. 6 is a cross-sectional view of a "Selsyn" or "Autosyn" transmitting motor and a pressure responsive actuator.
Figure 7:
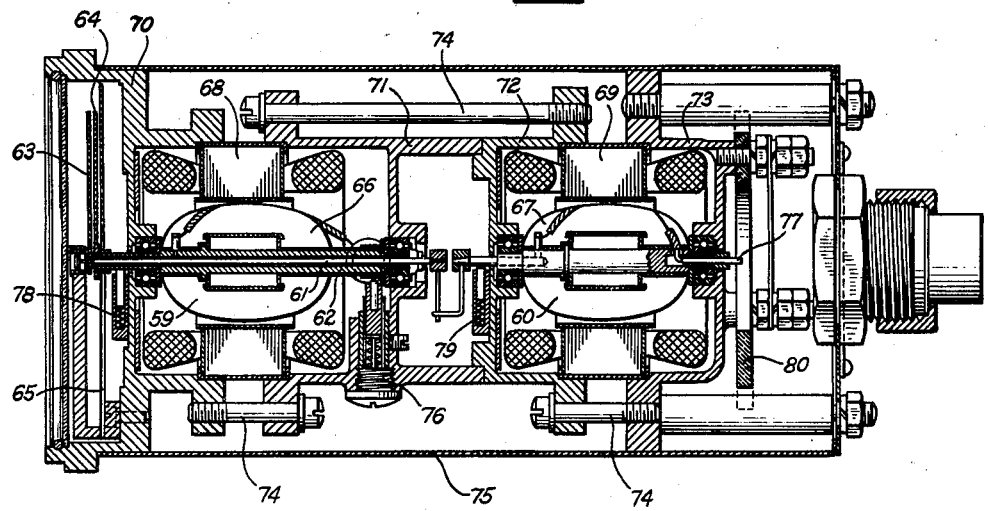
Fig. 7 is a cross-sectional view of the two coaxially arranged "Autosyn" or "Selsyn" receiving motors for actuating the pointers of the indicator in accordance with the invention.

Referring to the drawings, there is shown an application of the invention in connection with a twin-engined airplane in which the various indicators normally employed to indicate the operating characteristics of the two engines are replaced by a single indicator 1, capable of giving to the pilot all indications concerning such characteristics as, for example, oil temperature, oil pressure, fuel pressure, temperature of the engine-cooling water, etc.

According to the illustrated embodiment, the indicator 1 comprises two pointers 2 and 3, of which one pointer is designated to indicate the relative characteristics of an engine 4 which, in this instance is the left or "port" engine while the other pointer indicates the relative characteristics of the right or "starboard" engine 5. The measuring devices 6, 7, 8, 9, 10, 11, 12 and 13 of the various factors characterizing the operation of the engines are placed adjacent the engines, and electric means, such as "Autosyn" or "Selsyn" motors, are provided for a distant transmission of the indications of these measuring devices so as to operate the two pointers 2 and 3 of the single indicator 1 placed upon the instrument panel. This single indicator comprises two coaxial "Autosyn" receiving motors which can alternately be connected with the various measuring devices 6 to 13, inclusive. To this end, a selector switch 15 is provided, the latter having four positions A, B, C and D corresponding respectively to the connection of the two pointers 2 and 3 of the indicator to the water thermometers 9 and 13 of the two engines, to the oil thermometers 7 and 11 to the oil pressure-responsive devices 6 and 10 of the two engines, and to the fuel pressure-responsive devices 8 and 12. Due to this fact, the dial 14 of the instrument is provided with three concentric scales, the outer scale corresponding to the indications of the oil pressure, the intermediate or center scale corresponding to the indications of the temperature of both the water and the oil, and the inner scale corresponding to the pressure of the fuel.

The pointers 2 and 3 are provided with laterally projecting indices 16 and 17, respectively, arranged to project in opposite directions, which indices serve to distinguish the pointer corresponding to the left engine from the pointer corresponding to the right engine. Further, for each of the four positions of the seelctor switch 15, there are provided pilot lamps a, b, c, d. The circuits of each of these lamps are controlled respectively by two contactors or interruptors 18—22, 19—23, 21—25, 20—24 operated by the devices responsive to the changes of the corresponding characteristics of the two engines.

In other words, adjacent to each measuring device of each of the two engines, there is arranged an automatic interruptor operated in response to the changes of the measuring devices and preferably when a predetermined maximum or normal value is reached. These interruptors are connected two by two so as to control the pilot lamps a, b, c, d corresponding to the various positions of the selector switch 15 of the indicator. With these arrangements, as long as the pilot lamps are not lighted, the indication is that the operation of the two engines with respect to the pressure of the oil and the fuel, and the temperature of the oil and the water is normal, but as soon as one of these factors undergoes a change exceeding a predetermined limit, the corresponding lamp lights up, and the pilot of the aircraft is immediately informed that the operation of the engine is not normal. By turning the selector switch so as to bring it in front of the pilot lamp, the operator or pilot automatically connects the two receiving motors of the pointers to the two corresponding measuring devices, and gets immediately a quantitative indication of the same two factors of the two engines, thus permitting him to determine which of the two engines is failing, in what respect and to what extent. For example, if the selector switch 15 is in position A, the two coaxial "Autosyn" receiving motors of the indicator 1 are respectively connected to the "Autosyn" transmitters operated by the respective water-temperature responsive devices of the two engines 4 and 5 so that pointer 2 indicates on the center scale the water temperature of the left or "port" engine and pointer 3 indicates on the same scale the water temperature of the right or "starboard" engine; if the switch is in position B, then the "Autosyn" receiving motors of the indicator are respectively connected to the "Autosyn" transmitters operated by the respective oil-temperature responsive devices of the two engines; in position C, the "Autosyn" receiving motors are connected to the respective transmitters operated by the respective oil-pressure responsive devices of the two engines; and in position D the receivers are connected to the fuel pressure transmitters. In position B, the center scale of the dial is used as in position A; in position C the outer scale is used; and in position D, the inner scale is used.

The electrical system employed in carrying out the invention, as represented, is based upon the principle of the "Autosyn" or "Selsyn" motors (Figs. 2 and 3). In this system, as is well known, a transmitter motor and a receiver motor are required in order to effect a remote transmission of an indication, said transmitter and receiver being identical in mechanical and electrical construction, each comprising a rotor 27 having a single-phase winding, and a stator 26 having a three-phase winding. The "Autosyn" motors are preferably of the type shown in applicants' co-pending application Serial No. 2,292, filed January 17, 1935, and which has become Patent No. 2,038,059, April 21, 1936. The two stators are electrically connected with one another and the rotors are also connected to each other and are supplied with a single-phase current from the same source. By virtue of the known operation of "Selsyn" motors, a synchronous arrangement is obtained such that each movement induced mechanically to one of the rotors of the transmitting motor is reproduced by the receiving rotor connected thereto. In the application of this principle according to the present invention, each of the measuring devices, such as 28, placed near the motor is provided with a transmitter 29, and the indicator comprises two coaxial receivers which are respectively connected to two transmitters operated by the respective measuring devices which measure similar factors of the two motors.

Fig. 4 shows an example of a mechanism to control the circuits of the pilot lamps by the interruptor as used, said interruptor being combined with a Bourdon tube 38, and two contacts 39—40.

The alternating single-phase current for exciting the rotors of the "Autosyn" motors is furnished by two alternators 31 and 32 installed one on each of the engines, and which are arranged and connected so as to supply the necessary current to operate the system even if one of the alternators be put out of circuit or rendered inoperative.

The direct current for energizing the alternators, and the circuits of the lamps is supplied by a battery 33. The connections between the various elements of the system are effected by means of three junction boxes 34, 35 and 36.

The arrangement described herein eliminates from the instrument panel of a two-engined airplane at least eight instruments designated to indicate the essential factors characterizing the operation of the two engines, such as two oil temperature indicators, two water temperature indicators, two oil pressure gauges and two fuel pressure gauges, and replaces them by a single indicator which will permit the pilot to observe the operation of the engines in a much more simple and easy manner because he is no longer required to constantly observe these instruments as long as the warning lamps are not lighted, this being an indication of the normal operation of the motors.

A similar system may be used in connection with airplanes having more than two engines or only one engine. In a four-engined aircraft, for instance, two double indicators are used which will permit the replacing of sixteen instruments which otherwise, must be placed upon the instrument panel to indicate the pressures of the fuel and of the oil, as well as the temperatures of the water and the oil of the four engines. In the case of a single-engined aircraft one indicator is used as in the present embodiment but with ony one pointer and one "Autosyn" receiver which can be alternately connected by means of the selector switch 15 to any one of the "Autosyn" transmitters operated by the respective factor-responsive devices at the engine so that the pointer will alternately indicate one of the factors on a respective one of the plurality of scales; the indicator will then replace four separate indicators.

Although only one embodiment of the invention has been illustrated and described, various changes, which will now appear to those skilled in the art, may be made in the form and relative arrangement of the parts without departing from the scope of the invention. Reference is, therefore, to be had to the appended claims for a definition of the limits of the invention.

What is claimed is:

1. In combination, two or more engines and means for indicating a plurality of factors contributing to the operation of said engines, said means including an indicating device remote from said engines and having a pointer for each engine and a dial provided with a plurality of scales with each of which all of said pointers are arranged to cooperate, an electrical responsive device for each of said pointers for actuating them, a plurality of devices at each engine, each device being responsive to a different factor, an electrical transmitter for each factor-responsive device and operated thereby, and means for selectively connecting one of the transmitters at each engine to a corresponding one of the electrical responsive means of said indicator, whereby said pointers are simultaneously actuated each to indicate selectively on the same scale one of the factors of an associated engine.

2. In combination, two or more engines and means for indicating a plurality of factors contributing to the operations of said engines, said means including an indicating device remote from said engines and having a pointer for each engine and a dial provided with a plurality of scales with each of which all of said pointers are arranged to cooperate, an electrical responsive device for each of said pointers for actuating them, a plurality of devices at each engine, each device being responsive to a different factor, an electrical transmitter for each factor-responsive device and operated thereby, and means for selecting any one of the transmitters of each engine and for simultaneously connecting said selected transmitters to a corresponding one of the electrical responsive means of said indicator, whereby said pointers are simultaneously actuated to indicate the selected factor on the same one of the plurality of scales.

WLADIMIR A. REICHEL.
MORRIS F. KETAY.